US012112245B2

(12) United States Patent
Narihira (10) Patent No.: US 12,112,245 B2
(45) Date of Patent: Oct. 8, 2024

(54) INFORMATION PROCESSING APPARATUS AND INFORMATION PROCESSING METHOD (71) Applicant: Sony Corporation, Tokyo (JP)

(72) Inventor: Takuya Narihira, Tokyo (JP)

(73) Assignee: Sony Corporation, Tokyo (JP)

( * ) Notice: Subject to any disclaimer, the term of this patent is extended or adjusted under 35 U.S.C. 154(b) by 964 days.

(21) Appl. No.: 17/254,213

(22) PCT Filed: Jun. 25, 2019

(86) PCT No.: PCT/JP2019/025114
§ 371 (c)(1),
(2) Date: Dec. 18, 2020

(87) PCT Pub. No.: WO2020/004375
PCT Pub. Date: Jan. 2, 2020

(65) Prior Publication Data
US 2021/0272020 A1 Sep. 2, 2021

(30) Foreign Application Priority Data

Jun. 29, 2018 (JP) ................. 2018-124085

(51) Int. Cl.
*G06N 20/00* (2019.01)
*G06F 16/9035* (2019.01)
*G06F 18/213* (2023.01)
*G06F 18/214* (2023.01)
*G06F 18/23* (2023.01)
*G06N 7/01* (2023.01)
*G06V 20/56* (2022.01)
(Continued)

(52) U.S. Cl.
CPC .......... *G06N 20/00* (2019.01); *G06F 18/214* (2023.01); *G06F 18/23* (2023.01); *G06V 20/597* (2022.01);
(Continued)

(58) Field of Classification Search
CPC ........ G06N 20/00; G06N 7/01; G06F 18/213; G06F 18/214; G06F 18/23;
(Continued)

(56) References Cited

U.S. PATENT DOCUMENTS

2009/0040054 A1* 2/2009 Wang .................. G06V 20/597
340/576
2017/0334454 A1 11/2017 Abe
(Continued)

FOREIGN PATENT DOCUMENTS

JP 2009157606 A 7/2009
JP 2014-075091 A 4/2014
(Continued)

OTHER PUBLICATIONS

International Written Opinion and English translation thereof mailed Sep. 10, 2019 in connection with International Application No. PCT/JP2019/025114.

(Continued)

*Primary Examiner* — Quoc A Tran
(74) *Attorney, Agent, or Firm* — Wolf, Greenfield & Sacks, P.C.

(57) ABSTRACT

According to the present disclosure, there is provided an information processing apparatus including: a parameter acquisition unit (102) that acquires parameters collected from a sensor; and a reference model acquisition unit (108) that generates or selects a reference model recommended depending on a situation on the basis of a model extracted on the basis of the parameters. With this configuration, the driver can obtain an expected value in consideration of various factors during driving, disturbance, or the like.

9 Claims, 6 Drawing Sheets

(51) Int. Cl.
   *G06V 20/59*   (2022.01)
   *G08G 1/01*    (2006.01)
   *G08G 1/13*    (2006.01)
(52) U.S. Cl.
   CPC ........ *G06F 16/9035* (2019.01); *G06F 18/213* (2023.01); *G06N 7/01* (2023.01); *G06V 20/588* (2022.01); *G06V 20/59* (2022.01); *G08G 1/01* (2013.01); *G08G 1/13* (2013.01)
(58) Field of Classification Search
   CPC .................. G06F 16/9035; G06V 20/597; G06V 20/588; G06V 20/59; G08G 1/01; G08G 1/13
   See application file for complete search history.

(56) References Cited

U.S. PATENT DOCUMENTS

2018/0194280 A1* 7/2018 Shibata ............. G01C 21/3484
2019/0362162 A1* 11/2019 Averbuch ........... G01C 21/3815
2019/0375420 A1* 12/2019 Hou ..................... B60W 40/09

FOREIGN PATENT DOCUMENTS

JP  2015-170126 A   9/2015
JP  2017-206152 A  11/2017
JP  2018-097737 A   6/2018

OTHER PUBLICATIONS

International Preliminary Report on Patentability and English translation thereof mailed Jan. 7, 2021 in connection with International Application No. PCT/JP2019/025114.

International Search Report and English translation thereof mailed Sep. 10, 2019 in connection with International Application No. PCT/JP2019/025114.

Li et al., InfoGAIL: Interpretable Imitation Learning from Visual Demonstrations. 31st Conference on Neural Information Processing Systems. Nov. 14, 2017. 14 pages. URL:https://arxiv.org/abs/1703.08840.

* cited by examiner

SENSOR INFORMATION

- CAR OPERATION INFORMATION
  - ACCELERATOR
  - WIPER
  - CAR NAVIGATION, ETC.
- CAMERA
- LiDAR
- POSITIONING/IMU
- RADAR
- VOICE MICROPHONE
- SEAT OCCUPANCY SENSOR
- CAR CONDITION (GASOLINE, ETC.)
- MODE (USER DESIGNATION)
- LIFE LOG APP, CALENDAR INFORMATION, ETC.
- WEATHER
- ...

102
PARAMETER EXTRACTION

CONTEXT INFORMATION

- DRIVER AND ITS CONDITIONS (WHO, FEELINGS, ETC.)
- PASSENGER AND ITS CONDITIONS (WHO, HOW MANY, FEELINGS, ETC.)
- SITUATION (DATING, DRIVING, PRACTICING, ETC.)
- MOOD
- IN CASE OF GAME
  - GAME STAGE
  - USER LEVEL
  - GAME MODE (RACE, TRAINING, ETC.)
- ...

INFORMATION PROCESSING APPARATUS AND INFORMATION PROCESSING METHOD

CROSS-REFERENCE TO RELATED APPLICATIONS

This application claims the benefit under 35 U.S.C. § 371 as a U.S. National Stage Entry of International Application No. PCT/JP2019/025114, filed in the Japanese Patent Office as a Receiving Office on Jun. 25, 2019, which claims priority to Japanese Patent Application Number JP2018-124085, filed in the Japanese Patent Office on Jun. 29, 2018, each of which is hereby incorporated by reference in its entirety.

FIELD

The present disclosure relates to an information processing apparatus and an information processing method.

BACKGROUND

Conventionally, for example, the following Non Patent Literature 1 describes a technology that is supposed to better capture a latent structure that is the basis of a demonstration by humans and the like and recover a semantically meaningful factor of data.

CITATION LIST

Non Patent Literature

Non Patent Literature 1: Yunzhu Li, Jiaming Song, Stefano Ermon, "InfoGAIL: Interpretable Imitation Learning from Visual Demonstrations", [Searched on Jun. 29, 2018], Internet <URL: https://arxiv.org/abs/1703.08840>

SUMMARY

Technical Problem

For example, when driving a vehicle, if the driver can know an ideal trajectory, the driver can drive on an optimal trajectory. In particular, if the driver can obtain an expected value in consideration of various factors during driving, disturbance, or the like, the easiness of driving is significantly improved.

Therefore, it has been desired for the user to obtain an expected value in consideration of various factors during driving, disturbance, or the like.

Solution to Problem

According to the present disclosure, an information processing apparatus is provided that includes: a parameter acquisition unit that acquires parameters collected by a sensor; and a reference model acquisition unit that generates or selects a reference model recommended depending on a situation on a basis of a model extracted on a basis of the parameters.

Moreover, according to the present disclosure, an information processing apparatus is provided that includes: a parameter acquisition unit that acquires parameters collected by a sensor; and a model extraction unit that performs clustering on a basis of the parameters to extract a plurality of models and extracts a selection model used when selecting a plurality of the models on a terminal side.

Moreover, according to the present disclosure, an information processing method is provided that includes: acquiring parameters collected by a sensor; and generating or selecting a reference model recommended depending on a situation on a basis of a model extracted on a basis of the parameters.

Advantageous Effects of Invention

According to the present disclosure, the user can obtain an expected value in consideration of various factors during driving, disturbance, or the like.

Note that the above effects are not necessarily limited, and it is possible to obtain any of effects described in this specification or other effects that can be detected from this specification together with or instead of the above effects.

DESCRIPTION OF EMBODIMENTS

A preferred embodiment of the present disclosure will be described in detail hereinbelow with reference to the accompanying drawings. Note that redundant descriptions will be omitted from the present specification and the drawings by assigning the same reference signs to components having substantially the same function configuration.

Note that the description will be given in the following order.

1. Summary of the present disclosure
2. Configuration example of system
2.1. Overall configuration of system
2.2. Processing performed by the travel parameter acquisition unit 102
2.3. Processing performed by the automatic driving model extraction unit 204
2.4. Processing performed by the driving model automatic selection/generation unit 106
2.5. Processing performed by the driving model selection UI 110
3. Examples of display
3.1. Example of display by the expected driving behavior display unit 114
3.2. Example of display by the feedback display unit 122
4. Example of context and driving behavior selection 5. Method of machine learning
5.1. Basic principle
5.2. Specific examples

1. SUMMARY OF THE PRESENT DISCLOSURE

The present disclosure relates to, for example, a technique of acquiring a log when driving a vehicle, extracting a driving model from the acquired log, and presenting information to a user by comparing a current driving state of the vehicle and the driving model. Note that the model is not limited to a driving model, but may be a model relating to reproduced music, communication with another vehicle, or the like, and, in this case as well, optimal information can be presented to the user on the basis of the model. Further, although the description will be given below by taking the operation of the vehicle as an example, the environment for acquiring the log is not limited to the driving of the vehicle, and can be applied to various environments.

2. CONFIGURATION EXAMPLE OF SYSTEM 2.1. Overall Configuration of System

Figure 1:
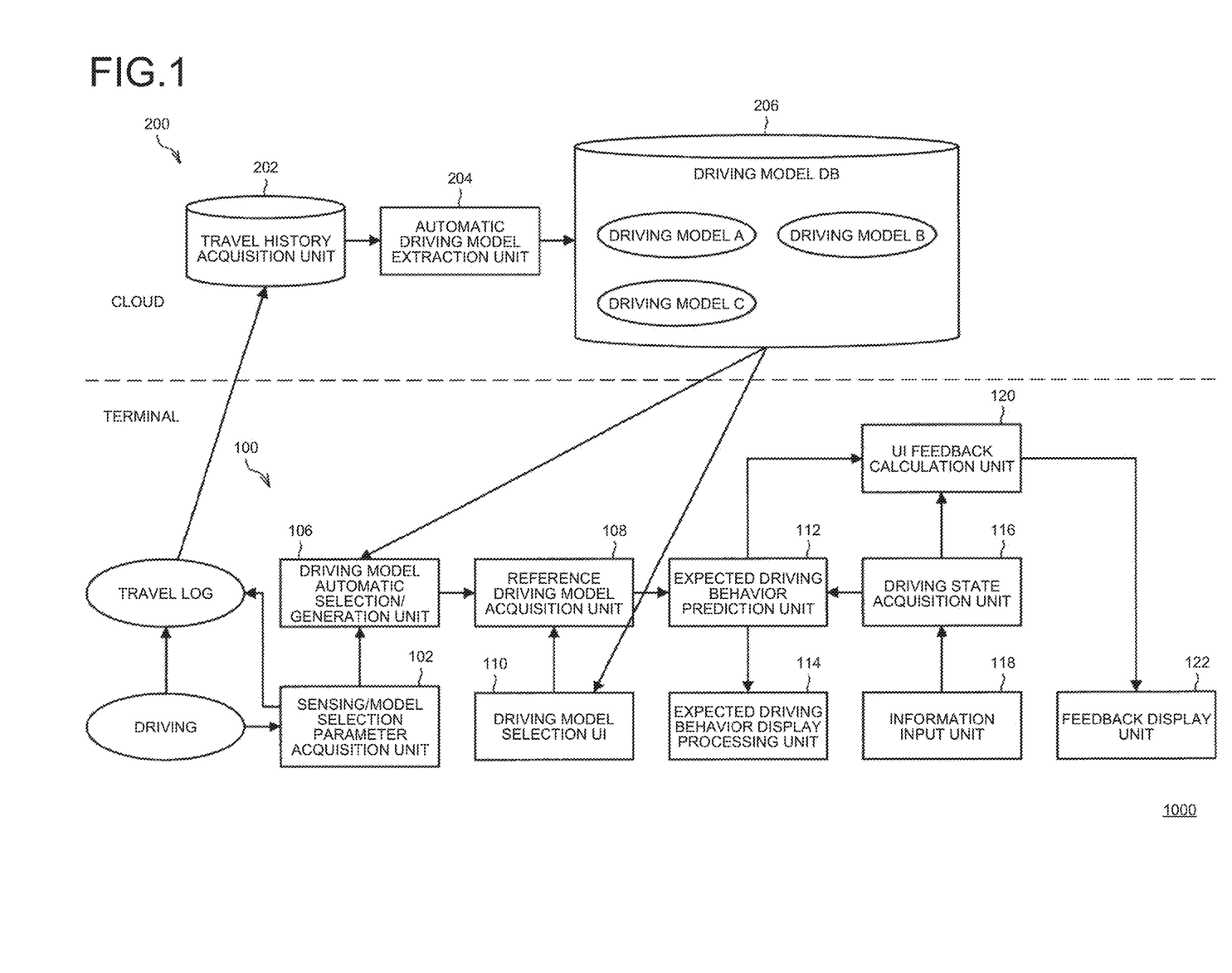
FIG. 1 is a schematic diagram illustrating a configuration of an information processing system 1000 according to an embodiment of the present disclosure.

FIG. 1 is a schematic diagram illustrating a configuration of an information processing system 1000 according to an embodiment of the present disclosure. The information processing system 1000 can include a component on a terminal 100 side and a component on a cloud 200 side. Note that the role sharing of the component on the terminal 100 side and the component on the cloud 200 side illustrated in FIG. 1 is an example, and which side performs the processing can be arbitrarily set. For example, the processing of an automatic driving model extraction unit 204 may be performed on the terminal 100 side.

As illustrated in FIG. 1, the terminal 100 includes a travel parameter acquisition unit (sensing and model selection parameter acquisition unit) 102, a driving model automatic selection/generation unit 106, a reference driving model acquisition unit 108, a driving model selection UI 110, an expected driving behavior prediction unit 112, an expected driving behavior display unit 114, a driving state acquisition unit 116, an information input unit 118, a UI feedback calculation unit 120, and a feedback display unit 122.

On the cloud 200 side, a travel history acquisition unit 202, an automatic driving model extraction unit 204, and a driving model database (DB) 206 are provided. Note that the component of the terminal 100 and the cloud 200 illustrated in FIG. 1 can be configured by a circuit (hardware) or a central processing unit such as a CPU and a program (software) for causing it to function.

The travel parameter acquisition unit 102 of the terminal 100 acquires various parameters for driving the vehicle from various sensors. The various parameters acquired by the travel parameter acquisition unit 102 are sent to the cloud 200 as a travel log and acquired by the travel history acquisition unit 202. The travel log may include context information described later. The automatic driving model extraction unit 204 extracts a driving model from the travel log. The extracted driving model is accumulated in the driving model database 206.

The driving model automatic selection/generation unit 106 of the terminal 100 generates a driving model or selects a driving model on the basis of the various parameters acquired by the travel parameter acquisition unit 102. Specifically, the driving model automatic selection/generation unit 106 acquires the driving model accumulated in the driving model database 206 on the cloud 200 side, and, on the basis of the various parameters acquired by the travel parameter acquisition unit 102, selects an optimum driving model corresponding to the driving state of the vehicle or generates a driving model. The selected or generated driving model is used as a reference driving model and is acquired by the reference driving model acquisition unit 108. Note that the driving model automatic selection/generation unit 106 and the reference driving model acquisition unit 108 constitute the "reference model acquisition unit" according to the present disclosure.

Note that a plurality of reference driving models may be selected or generated and the user may select one model from the plurality of reference driving models using the driving model selection UI 110 to select the final one reference driving model.

The expected driving behavior prediction unit 112 predicts expected driving behavior when driving is performed by the reference driving model. Specifically, the expected driving behavior prediction unit 112 predicts a driving behavior expected when driving is performed by the reference driving model on the basis of the driving state of the vehicle acquired by the driving state acquisition unit 116. The expected driving behavior display unit 114 performs processing of displaying the driving behavior predicted by the expected driving behavior prediction unit 112 on a display device.

The driving state acquisition unit 116 acquires various parameters indicating the driving state of the vehicle. Note that the driving state acquisition unit 116 may be configured in common with the travel parameter acquisition unit 102.

The UI feedback calculation unit 120 calculates the difference between the driving behavior predicted by the expected driving behavior prediction unit 112 and the driving state of the vehicle acquired by the driving state acquisition unit 116 as a feedback amount. The feedback display unit 122 performs processing of displaying the feedback amount calculated by the UI feedback calculation unit 120 on the display device.

2.2. Processing Performed by the Travel Parameter Acquisition Unit 102

Figure 2:
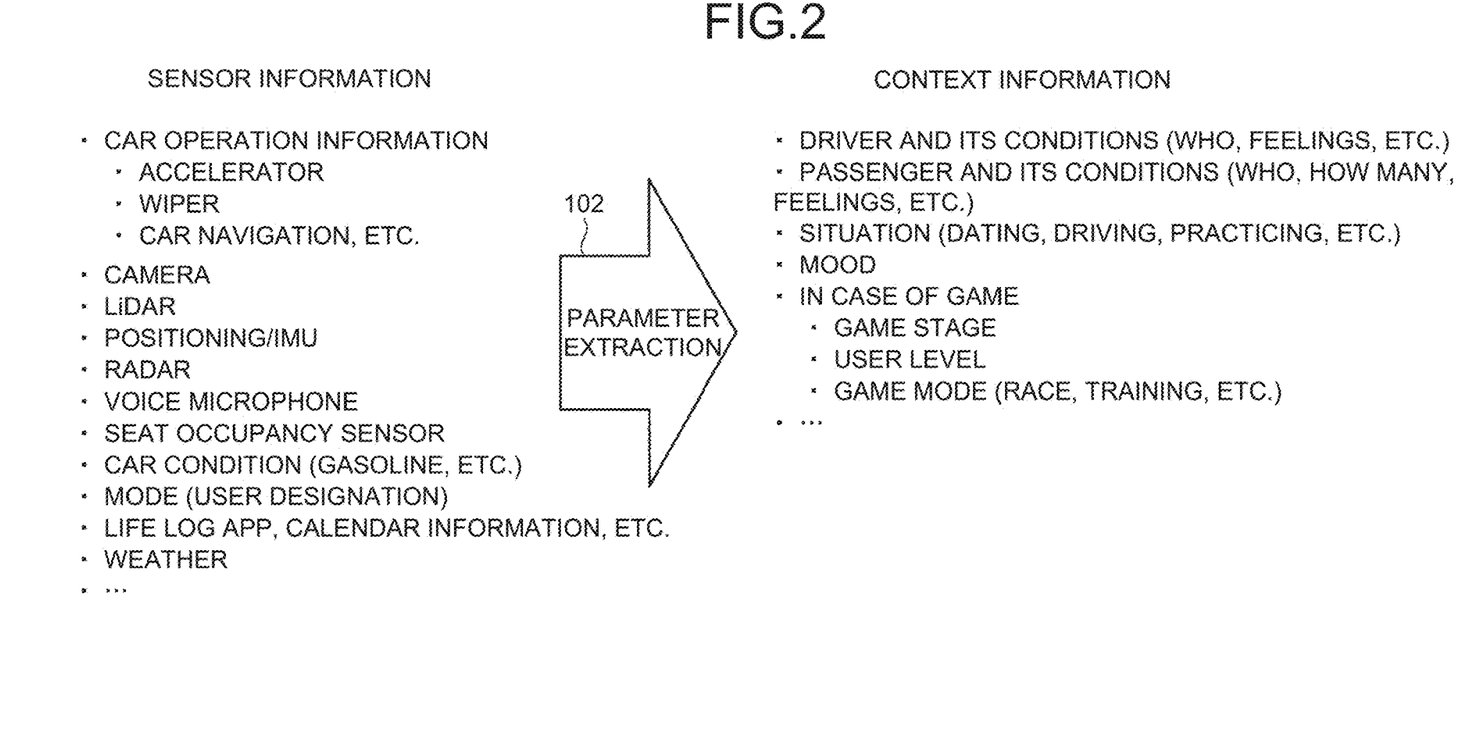
FIG. 2 is a schematic diagram illustrating processing performed by a travel parameter acquisition unit 102.

FIG. 2 is a schematic diagram illustrating processing performed by the travel parameter acquisition unit 102. Input information detected by various sensors and the like is input to the travel parameter acquisition unit 102. For example, the input information includes vehicle operation information (accelerator, brake, steering wheel, wiper, car navigation). Further, the input information include various information, e.g., of a camera provided in the vehicle, laser imaging detection and ranging (LiDAR), a positioning/inertial measurement unit (IMU), a RADAR, a voice microphone, a seat occupancy sensor, and a gasoline level sensor. Further, the input information includes information about a mode designated by the user, information about a life log application, a calendar, or the like, information about weather, and user profile information. The user profile information may include, for example, a car insurance grade. The input information is not particularly limited, and any information can be used as the input information. Further, these input information may be acquired from a terminal used by a user such as a smartphone.

The travel parameter acquisition unit 102 processes the input information and acquires the context information. As the context information, various kinds of information indicating the condition of the vehicle are acquired. For example, the context information includes information indicating the driver and its state (information indicating who is the driver, the driver's feelings, or the like), information indicating the passenger and its state (information indicating who is the passenger, the number of passengers, the feelings of the passenger, or the like), information indicating situations (dating, driving, practicing), and information indicating the mood in the vehicle.

Further, when the user is driving in a game instead of driving an actual vehicle, the context information includes information indicating a game stage, a user level, a game mode (race, training, or the like).

The processing of extracting the context information from the input information can be performed by a predetermined algorithm.

2.3. Processing Performed by the Automatic Driving Model Extraction Unit 204

Figure 3:
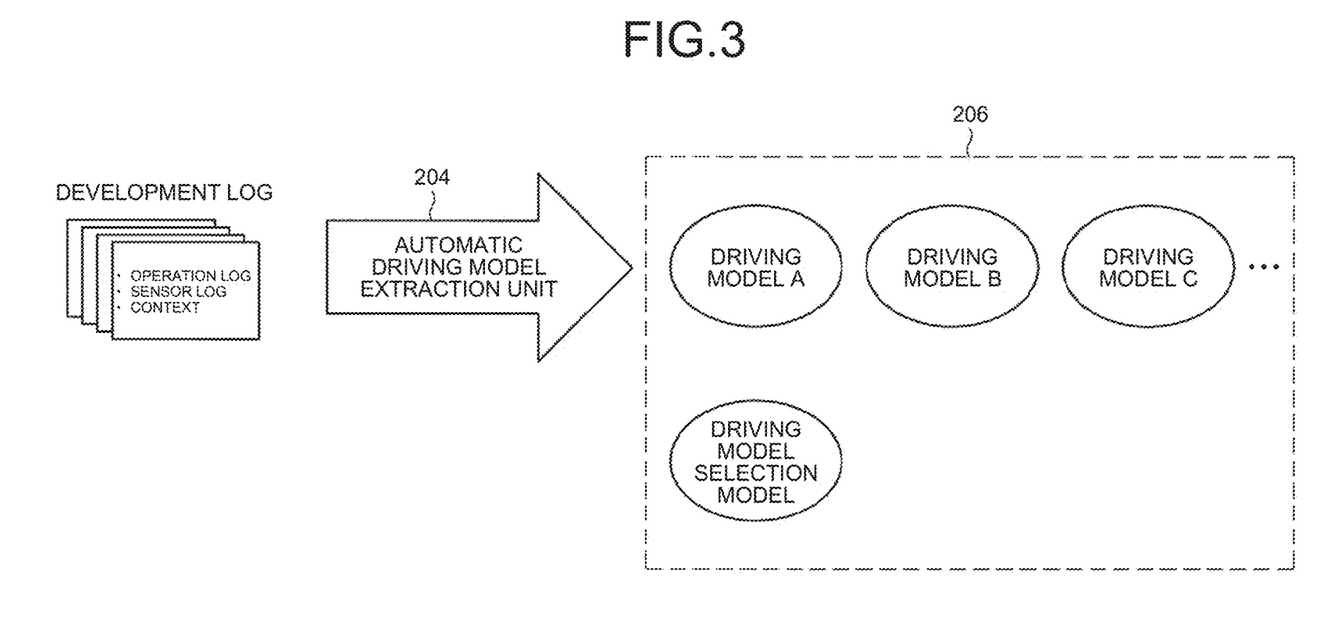
FIG. 3 is a schematic diagram illustrating processing performed by an automatic driving model extraction unit 204.

FIG. 3 is a schematic diagram illustrating processing performed by the automatic driving model extraction unit 204. The automatic driving model extraction unit 204 extracts a driving model from the travel log and the context information.

The automatic driving model extraction unit 204 performs clustering on the basis of the travel log and the context information to generate a plurality of different driving models. As a method of generating a driving model, machine learning or a method other than machine learning (for example, a rule using a context and an if statement) can be used. For example, driving model A is a driving model with high driving skill and high safety (gentle mode), driving model B is an aggressive driving model that prioritizes arrival time, and driving model C is a driving model that prioritizes energy efficiency. In addition to the above, as a driving model obtained by clustering, various models can be set, for example, a driving model when a famous racer drives, a driving model for driving in bad weather (rainfall, snowfall, strong wind, or the like), or the like.

Further, in addition to the driving model, the automatic driving model extraction unit 204 extracts a driving model selection model used when the driving model is selected on the terminal 100 side. The driving model selection model corresponds to a "hidden element" in machine learning, and is a model for selecting a driving model corresponding to a user from the driving models extracted by clustering. The driving model selection model will be described in detail later. Note that, as described later, "clustering" in the present disclosure is defined as including processing of extracting a driving model and processing of extracting a driving model selection model.

2.4. Processing Performed by the Driving Model Automatic Selection/Generation Unit 106

Figure 4:
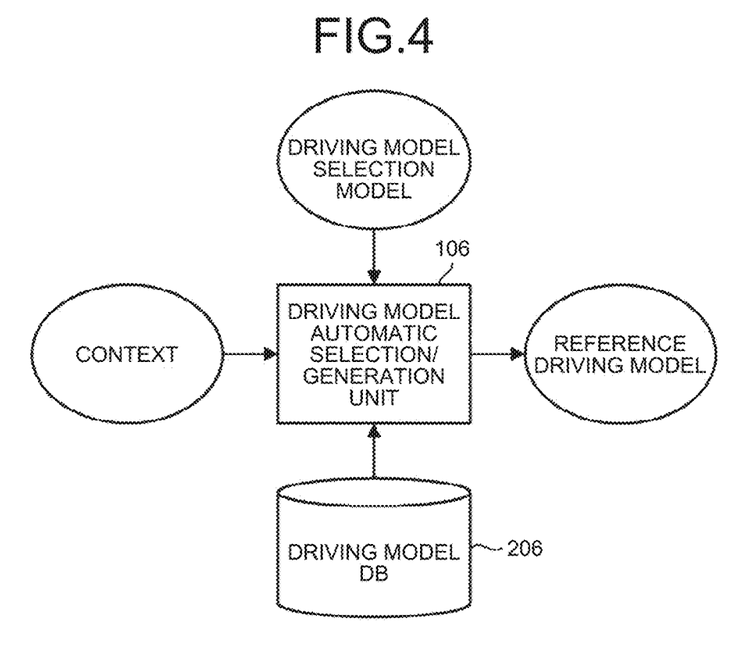
FIG. 4 is a schematic diagram illustrating processing performed by a driving model automatic selection/generation unit 106.

FIG. 4 is a schematic diagram illustrating processing performed by the driving model automatic selection/generation unit 106. The driving model automatic selection/generation unit 106 acquires the driving model and the driving model selection model accumulated in the driving model database 206 on the cloud 200 side, and, on the basis of the various parameters acquired by the travel parameter acquisition unit 102, selects an optimum driving model corresponding to the driving state of the vehicle. By using the driving model selection model, a driving model that matches the characteristics of the user can be selected.

Further, the driving model automatic selection/generation unit 106 acquires the driving model and the driving model selection model accumulated in the driving model database 206 on the cloud 200 side, and, on the basis of the acquired driving model, may generate an optimum driving model corresponding to the driving state of the vehicle. In this case, the driving model automatic selection/generation unit 106 may generate an optimal driving model according to the driving state of the vehicle from a plurality of driving models accumulated in the driving model database 206 on the cloud 200 side. Also in this case, by using the driving model selection model, a driving model that matches the characteristics of the user can be selected. As described above, the driving model automatic selection/generation unit 106 selects or generates a driving model having discrete or continuous characteristics with respect to the driving model accumulated in the driving model database 206. The driving model selected or generated by the driving model automatic selection/generation unit 106 is acquired by the reference driving model acquisition unit 108 as a reference driving model.

2.5. Processing Performed by the Driving Model Selection UI 110

Figure 5:
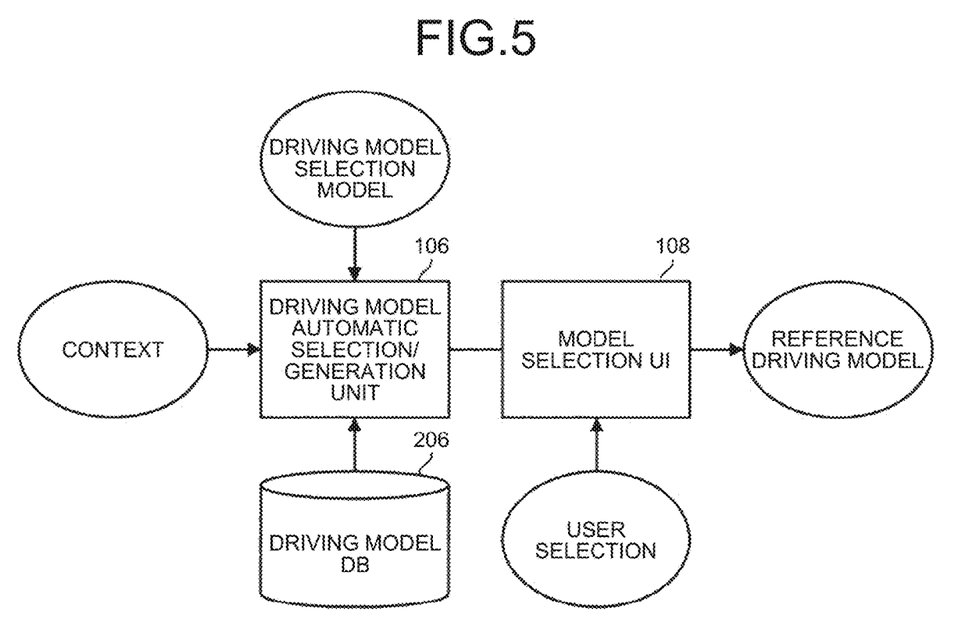
FIG. 5 is a schematic diagram illustrating processing performed by a driving model selection UI 110.

FIG. 5 is a schematic diagram illustrating processing performed by the driving model selection UI 110. The driving model selection UI 110 performs model selection according to the user's selection for the plurality of reference driving models selected or generated by the driving model automatic selection/generation unit 106. At this time, the driving model selection UI 110 indicates the characteristics that serve as a criterion for the selection by the user with respect to the plurality of reference driving models. For example, the criterion for the driving model is presented to the user such as "Select driving model A when performing safe driving, and select driving model C when performing driving that prioritizes energy efficiency". When the driving model selection UI 110 makes a selection according to the user's selection, one reference driving model is selected and acquired by the reference driving model acquisition unit 108.

3. EXAMPLES OF DISPLAY 3.1. Example of Display by the Expected Driving Behavior Display Unit 114

Figure 6:
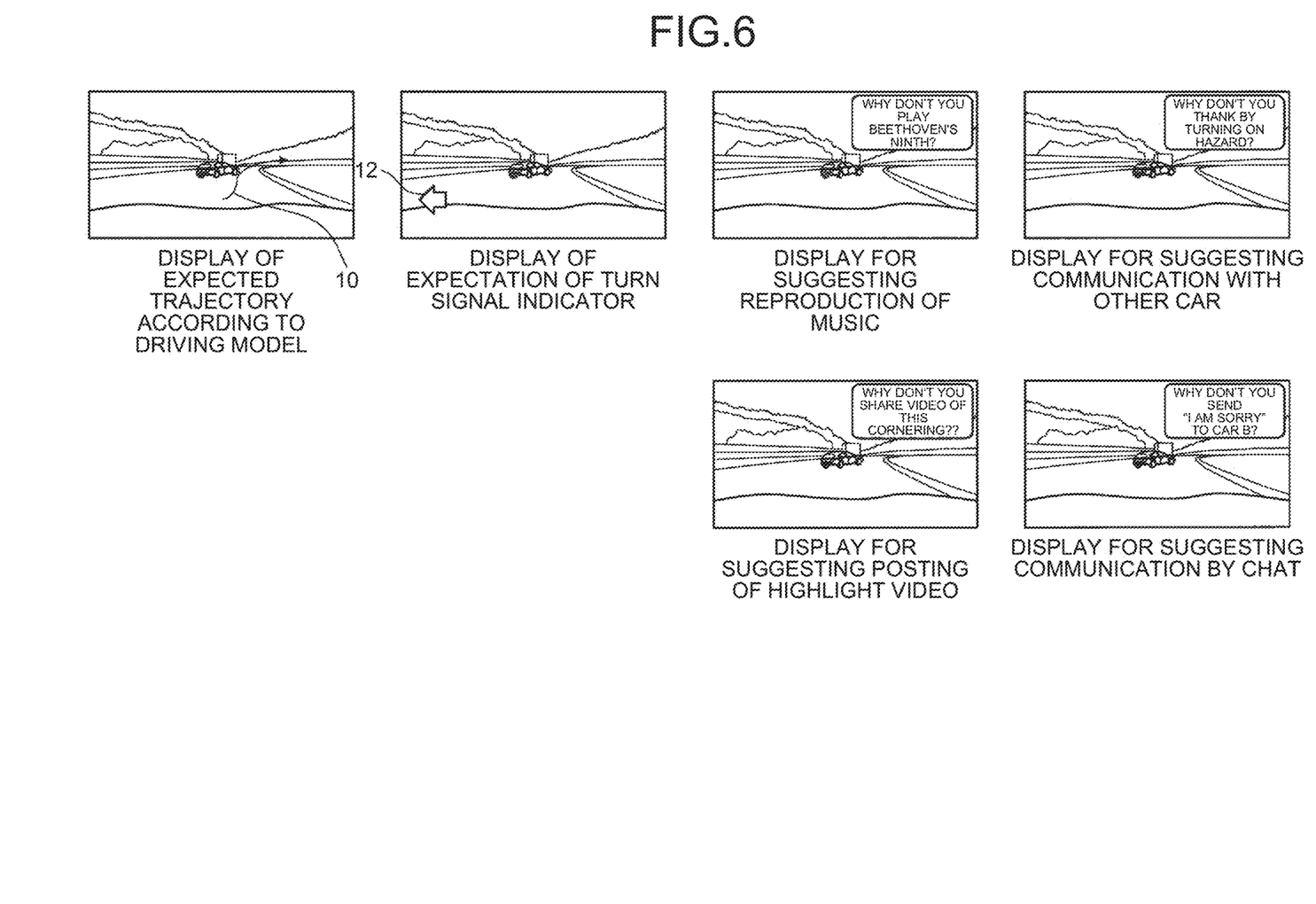
FIG. 6 is a schematic diagram illustrating an example of display by an expected driving behavior display unit 114.

FIG. 6 is a schematic diagram illustrating an example of display by the expected driving behavior display unit 114. As described above, the expected driving behavior display unit 114 performs processing of displaying the driving behavior predicted by the expected driving behavior prediction unit 112. FIG. 6 is a schematic diagram illustrating a screen displayed on the display device by the display processing by the expected driving behavior display unit 114.

Specifically, in FIG. 6, six display examples are illustrated: "display of expected trajectory according to driving model", "display of expectation of turn signal indicator", "display for suggesting playback of voice", "display for suggesting communication with other vehicle", "display for suggesting posting of highlight video", and "display for suggesting communication by chat".

In the "display of expected trajectory according to driving model", the environment ahead of the traveling direction is displayed on the screen, and the expected trajectory according to the driving model is indicated by an arrow 10 on the screen. In the "display of expectation of turn signal indicator", the direction in which the direction indicator should be output is indicated by an arrow 12. In the "display for suggesting playback of voice", recommended songs and artists are indicated for music to be reproduced. In the "display for suggesting communication with other vehicle", display recommending output of a hazard to another car is indicated. In the "display for suggesting posting of highlight video", display recommending posting of a video highlight, e.g., of cornering, when driving is in a game is indicated. In the "display for suggesting communication by chat", display recommending sending of a message to another vehicle is indicated. The "display for suggesting communication with other vehicle" and the "display for suggesting communication by chat" are both displays corresponding to compassionate actions with respect to another vehicle, and are concepts included in the gentle mode model.

3.2. Example of Display by the Feedback Display unit 122

Figure 7A:
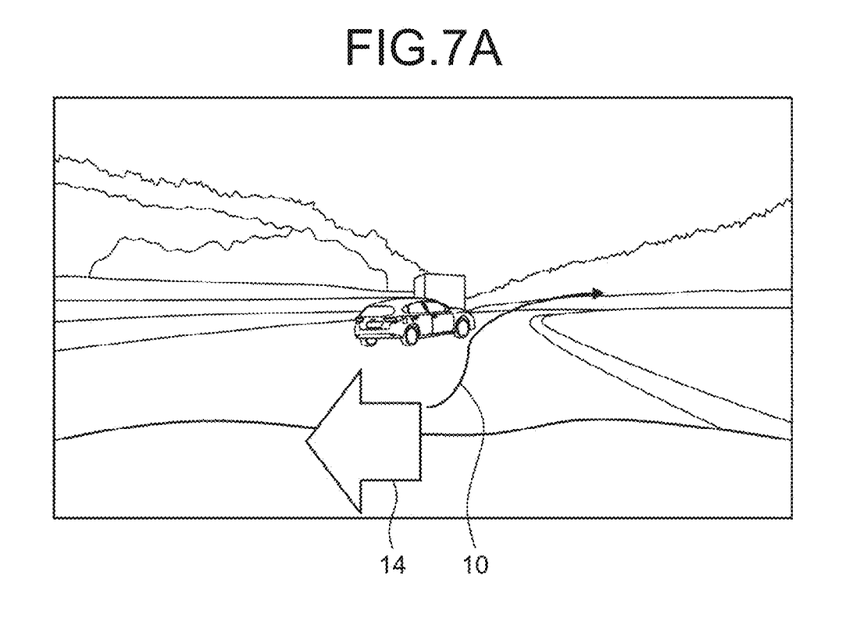
FIG. 7A is a schematic diagram illustrating an example of display by a feedback display unit 122.
Figure 7B:
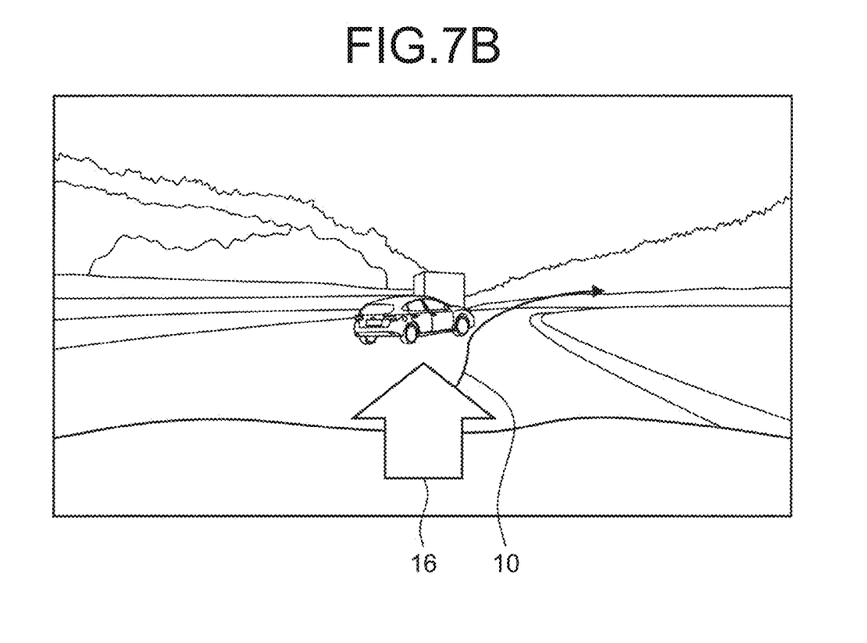
FIG. 7B is a schematic diagram illustrating an example of display by the feedback display unit 122.

FIGS. 7A and 7B are schematic diagrams illustrating an example of display by the feedback display unit 122. As described above, the UI feedback calculation unit 120 calculates the difference between the driving behavior predicted by the expected driving behavior prediction unit 112 and the driving state of the vehicle acquired by the driving state acquisition unit 116 as a feedback amount. The feedback display unit 122 displays the difference (mismatch) between the actual trajectory in the past and the proposed trajectory with an arrow or the like.

In the example illustrated in FIG. 7A, an arrow 14 indicates that the past trajectory was to the right of the proposed trajectory and the vehicle should have traveled further to the left. Further, in the example illustrated in FIG. 7B, an arrow 16 indicates that the past speed was slower than the proposed speed and the vehicle should have traveled at a faster speed.

4. EXAMPLE OF CONTEXT AND DRIVING BEHAVIOR SELECTION

A plurality of cases of context and driving behavior selection will be described below.

(Case 1)

In Case 1, it is assumed that when a vehicle is driving at a slow speed because a child is in the vehicle, the child feels sick. In this case, it is detected that the child feels sick, and an aggressive driving model is generated and used by the user in order to rush to a hospital or rest area. The detection that the child feels sick is detected by an image acquired by the camera, a voice acquired by the voice microphone, and the information acquired by other sensors.

(Case 2)

In Case 2, it is assumed that it suddenly rains when the vehicle is driving normally on a sunny day. In this case, the sensor detects that it is raining, and the driving model is changed to that suitable for a rainy day.

(Case 3)

In Case 3, it is assumed that the atmosphere inside the car becomes awkward when a low-tempo song is being played inside the car. In this case, the atmosphere inside the car is detected by voices, images, or the like, and a pleasant up-tempo song is played.

(Case 4)

In Case 4, it is assumed that in the case of a game, a player is successfully practicing cornering. In this case, the trajectory for drift is displayed on the screen. The displayed trajectory can be shared with other users.

5. METHOD OF MACHINE LEARNING 5.1. Basic Principle

Processing in the case where the automatic driving model extraction unit 204 extracts a driving model by machine learning will be described below. Note that the machine learning method is not particularly limited, but the summary of the case of using the method of InfoGAIL described in Non Patent Literature 1 described above will be described below.

When the input from the environment is x and the action output is y, the action policy π(y|x, z) can be learned in a model that considers a hidden state z like InfoGAIL. Further, in the learning process, a posterior probability p(z|x, y) model regarding the hidden state z can be obtained.

For example, in InfoGAIL, z learns with the objective function of maximizing mutual information and imitating action data. In this way, the attribute, state, or the like of the actor are extracted as a hidden state z from a large amount of action data, the hidden state z (attribute, state) is estimated at the time of execution, and the action output y at the time of considering the hidden state z and the input x from the environment can be determined.

The action output y is obtained from the input x. The input x includes the above-mentioned input information, context information obtained from the input information, and the like. The action output y is information related to vehicle driving such as the steering angle of the steering wheel and the depression amount of the accelerator pedal. Machine learning is performed so that the difference between the action output y and a correct answer y' is reduced. Note that the correct answer y' is teacher data.

At this time, the action output y changes according to the hidden state z. That is, the action output y is determined by the input x and the hidden state z, and the behavior of a function f that outputs the action output y from the input x changes depending on the hidden state z.

Therefore, in machine learning by InfoGAIL, a function indicating the relationship between the input x and the action output y can be obtained by learning, and a function defining the hidden element z can be obtained by learning. The function that defines the hidden element z corresponds to the driving model selection model described above.

For example, in cases where a specific user drives a vehicle, when the automatic driving model extraction unit 204 clusters the driving models from the travel logs, at the same time, the driving model selection model corresponding to the hidden element z is obtained. When the driving model automatic selection/generation unit 106 on the terminal 100 side selects and generates a driving model, the driving model selection model is used to select and generate the driving model on the basis of the user's attributes, state, or the like.

In the present disclosure, "clustering" refers to processing corresponding to acquisition of the hidden element z and the action output y. The hidden state z acquired in the learning process represents the type and properties of the model, and corresponds to the latent structure described above.

5.2. Specific Examples

In the following, Cases 1 to 3 described in the section "4. Example of context and driving behavior selection" will be described by applying the input x, the action output y, and the hidden state z.

(Case 1)

The input x in Case 1 "when a vehicle is driving at a slow speed because a child is in the vehicle, the child feels sick and an aggressive driving model is generated" is the input information and the context information described in FIG. 2. In particular, in the case of Case 1, the information about the condition of the child acquired by a biometric sensor, an in-vehicle camera, and an in-vehicle microphone corresponds to the input x.

Further, the change from the safe driving state to the rushing state corresponds to the hidden state z. Further, the driving behavior (the trajectory of the vehicle, other operation commands (steering angle, accelerator, brake, or the like)) corresponds to the action output y.

In the case of Case 1, on the basis of the change from the safe driving state to the rushing state being the hidden state z, the driving model that prioritizes arrival time or the driving model that performs aggressive driving is selected or generated. Therefore, the expected driving behavior and the feedback amount described above can be displayed on the basis of the reference driving model selected or generated in the above manner.

(Case 2)

The input x in Case 2 "sudden raining when the vehicle is driving normally on a sunny day is detected with a sensor and a change is made to a driving model suitable for a rainy day" is the input information and the context information described in FIG. 2. In particular, in the case of Case 2, the information of weather obtained from a temperature sensor, a smartphone, or the like, the detection information of the slip on the road surface, the image acquired by the camera (road surface condition, or the like) corresponds to the input x.

Further, changing from the driving state suitable for a sunny day to the driving state suitable for a rainy day corresponds to the hidden state z. Further, the driving behavior (the trajectory of the vehicle, other operation commands (steering angle, accelerator, brake, or the like)) corresponds to the action output y.

In the case of Case 2, on the basis of the hidden state z corresponding to the change from the driving model suitable for a sunny day to the driving state suitable for a rainy day, a driving state for bad weather (rainfall) is selected or generated. Therefore, the expected driving behavior and the feedback amount described above can be displayed on the basis of the reference driving model selected or generated in the above manner.

(Case 3)

The input x in Case 3 "when a low-tempo song is played in the car, the atmosphere inside the car has become awkward and a pleasant up-tempo song is played" is the input information and context information described in FIG. 2. In particular, in the case of Case 3, the image acquired by the in-vehicle camera, the voice acquired by the voice microphone, and the biometric information acquired by the biometric sensor correspond to the input x.

Further, changing from the state in which a calm atmosphere is desired to the state in which the atmosphere is desired to be brightened up corresponds to the hidden state z. Further, suggesting reproduction of certain music corresponds to the action output y.

In the case of Case 3, on the basis of the hidden state z corresponding to changing from the state in which a calm atmosphere is desired to the state in which the atmosphere is desired to be brightened up, a model for playing an up-tempo song is selected or generated. Therefore, the expected driving behavior and the feedback amount described above can be displayed on the basis of the model selected or generated in the above manner. In this case, it is possible to suggest the reproduction of music like the "display for suggesting the reproduction of music" in FIG. 6.

(Case 4)

The input x in in Case 4 "a player in a game is successfully practicing cornering in the game, and the trajectory for drift is displayed on the screen" is information including in-game observation, user's practice history, game mode, or the like.

Further, changing from the cornering practice state to the drift practice start state corresponds to the hidden state z. Further, further, suggesting reproduction of certain music corresponds to the action output y.

In the case of Case 4, on the basis of the hidden state z corresponding to changing from the cornering practice state to the drift practice start state, a model suggesting reproduction of certain music is selected or generated. Therefore, the expected driving behavior and the feedback amount described above can be displayed on the basis of the model selected or generated in the above manner.

While the preferred embodiments of the present disclosure have been described in detail above with reference to the accompanying drawings, the technical scope of the present disclosure is not limited to or by such examples. It will be apparent to those skilled in the art of the present disclosure that various modifications and alterations can be conceived within the scope of the technical idea described in the claims and naturally fall within the technical scope of the present disclosure.

Further, the effects described in the present specification are merely illustrative or exemplary and are not limited. That is, the technology according to the present disclosure can have other effects apparent to those skilled in the art from the description of the present specification, in addition to or instead of the above effects.

Note that the following configurations are also included in the technical scope of the present disclosure.

(1)

An information processing apparatus comprising:
 a parameter acquisition unit that acquires collected parameters; and
 a reference model acquisition unit that generates or selects a reference model recommended depending on a situation on a basis of a model extracted on a basis of the parameters.

(2)

The information processing apparatus according to (1), wherein the reference model acquisition unit generates or selects the reference model on a basis of a plurality of the models extracted on the basis of the parameters and a selection model for selecting the plurality of models.

(3)

The information processing apparatus according to (2), comprising a model extraction unit that extracts the plurality of models by performing clustering on the basis of the parameters.

(4)

The information processing apparatus according to (3), wherein the model extraction unit extracts the plurality of models and extracts the selection model on the basis of the parameters.

(5)

The information processing apparatus according to (4), wherein the model extraction unit extracts the model by performing learning of an action output with respect to the parameters, which is an input, on a basis of teacher data, and the selection model corresponds to a hidden element obtained at a time of the learning.

(6)

The information processing apparatus according to any one of (1) to (5), wherein the reference model acquisition unit acquires one of the reference models selected by a user from among a plurality of the generated or selected reference models.

(7)

The information processing apparatus according to (3), further comprising a behavior prediction unit that predicts expected behavior depending on the situation on a basis of the reference model.

(8)

The information processing apparatus according to (7), further comprising a behavior display processing unit that performs processing for displaying a behavior predicted by the behavior prediction unit.

(9)

The information processing apparatus according to (8), further comprising:
- a comparison unit that compares an actual driving state and the predicted behavior; and
- a comparison result display processing unit that performs processing for displaying a result of the comparison by the comparison unit.

(10)

An information processing apparatus comprising:
- a parameter acquisition unit that acquires collected parameters; and
- a model extraction unit that performs clustering on a basis of the parameters to extract a plurality of models and extracts a selection model used when selecting a plurality of the models on a terminal side.

(11)

An information processing method comprising:
acquiring collected parameters; and
generating or selecting a reference model recommended depending on a situation on a basis of a model extracted on a basis of the parameters.

REFERENCE SIGNS LIST

102 TRAVEL PARAMETER ACQUISITION UNIT
106 DRIVING MODEL AUTOMATIC GENERATION/SELECTION UNIT
108 REFERENCE DRIVING MODEL ACQUISITION UNIT
112 EXPECTED DRIVING BEHAVIOR PREDICTION UNIT
114 EXPECTED DRIVING BEHAVIOR DISPLAY PROCESSING UNIT
120 UI FEEDBACK CALCULATION UNIT
122 FEEDBACK DISPLAY UNIT
202 TRAVEL HISTORY ACQUISITION UNIT
204 AUTOMATIC DRIVING MODEL EXTRACTION UNIT

The invention claimed is:

1. An information processing apparatus comprising:
processing circuitry configured to:
acquire collected parameters; and
select a reference model recommended depending on a situation on a basis of a model extracted on a basis of the collected parameters, wherein the reference model is selected from a plurality of models, wherein the processing circuitry is configured to select the reference model on a basis of the plurality of models extracted on the basis of the collected parameters and a selection model for selecting the plurality of models, and wherein the selection model corresponds to a hidden element obtained at a time of learning.

2. The information processing apparatus according to claim 1, wherein the processing circuitry is configured to extract the plurality of models by performing clustering on the basis of the parameters.

3. The information processing apparatus according to claim 2, wherein the processing circuitry is configured to extract the plurality of models and to extract the selection model on the basis of the parameters.

4. The information processing apparatus according to claim 3, wherein the processing circuitry is configured to extract the model by performing learning of an action output with respect to the parameters, which is an input, on a basis of teacher data.

5. The information processing apparatus according to claim 1, wherein the processing circuitry is configured to acquire one of the reference models selected by a user from among the plurality of models.

6. The information processing apparatus according to claim 2, wherein the processing circuitry is further configured to predict expected behavior depending on the situation on a basis of the reference model.

7. The information processing apparatus according to claim 6, wherein the processing circuitry is further configured to perform processing for displaying a predicted behavior.

8. The information processing apparatus according to claim 7, wherein the processing circuitry is further configured to:
compare an actual driving state and the predicted behavior; and
perform processing for displaying a result of the comparison.

9. An information processing method executed by processing circuitry, the method comprising:
acquiring collected parameters; and
selecting a reference model recommended depending on a situation on a basis of a model extracted on a basis of the collected parameters, wherein the reference model is selected from a plurality of models, wherein the reference model is selected on a basis of the plurality of models extracted on the basis of the collected parameters and a selection model for selecting the plurality of models, and wherein the selection model corresponds to a hidden element obtained at a time of learning.

* * * * *